United States Patent [19]

Eckstein et al.

[11] Patent Number: 4,828,590

[45] Date of Patent: May 9, 1989

[54] FILTER ARRANGEMENT

[75] Inventors: Wolfgang Eckstein, Sereetz; Karl-Heinz Schirk, Lubeck, both of Fed. Rep. of Germany

[73] Assignee: Draegerwerk Aktiengesellschaft, Fed. Rep. of Germany

[21] Appl. No.: 192,385

[22] Filed: May 10, 1988

[30] Foreign Application Priority Data

May 15, 1987 [DE] Fed. Rep. of Germany ....... 3716243

[51] Int. Cl.[4] .............................................. B01D 50/00
[52] U.S. Cl. ....................................... 55/316; 55/267;
55/342; 55/350; 55/387; 55/484; 55/337;
55/502
[58] Field of Search ................. 55/267, 316, 323, 336,
55/337, 342, 350, 484, 387, 502, 507, 509

[56] References Cited

U.S. PATENT DOCUMENTS 2,171,248 8/1939 Van Berkel ........................... 55/323

FOREIGN PATENT DOCUMENTS 800503 2/1981 U.S.S.R. ................................ 55/316

Primary Examiner—Bernard Nozick
Attorney, Agent, or Firm—McGlew & Tuttle

[57] ABSTRACT

A filter arrangement for cleaning the interiors of ventilated vehicles, containing a coarse dust preseparator, a submicron particulate filter, and a gas filter, is to be improved so that the necessary filter lifetime can be adapted to the gas filter lifetime and a changing of the filters is necessary only when both are used up at approximately the same time. For this, a coarse dust preseparator or cyclone filter of high separation efficiency is mounted on an outer housing, downstream from which is at least one submicron particulate filter accommodated in a common filter housing and a gas filter as a filter module.

6 Claims, 2 Drawing Sheets

FILTER ARRANGEMENT

BACKGROUND OF THE INVENTION

Field of the Invention

This invention relates in general to filters, and in particular to a new and useful filter arrangement for cleaning the interiors of ventilated vehicles, which contains a coarse dust preseparator, a submicron particulate filter, and a gas filter.

Such filter arrangements serve primarily to clean vehicles or military vehicles which are used in regions contaminated with noxious substances of gaseous or particulate composition. The close quarters for the personnel to be protected or accommodated in such vehicles require a configuration of limited space for the respective filter elements.

In the known filter arrangements, the individual filters are each interchangeably installed in a common housing. Depending on the burden of dust particles or noxious gases in the outside air, the filters are replaced by new ones at varying times.

Because of the higher concentrations of dust occurring during driving of the vehicles, especially off the road, the submicron particulate filters are frequently clogged after a short time of operation. The gas filters always hold out longer, since the substances which they are intended to remove generally occur in small concentrations. Thus, up to the present, it has been necessary to replace the submicron particulate filters and gas filters separately.

Addition of a preseparator does not improve the situation, as this extends the need for replacement to three filter stages. It is now necessary to match three different separation efficiencies to an unforeseeable amount of noxious substances (DE-PS No. 26 35 860).

SUMMARY OF THE INVENTION

The present invention provides an improved filter arrangement in such a way that the necessary filter lifetimes can be better adapted to the lifetime of the gas filter. Changing of the filter should be necessary only when both elements are used up at approximately the same time.

The high efficiency cyclone separator removes a large portion of the dust particles from the remaining air stream, and this need no longer be considered in the calculation of the lifetime of the submicron particulate filter.

Under comparable operating conditions, the lifetime of the submicron particulate filter is two to three times longer than previously. The formerly shorter lifetime of this can be appropriately adapted to that of the gas filter. This, in turn, leads to a space-economizing but more efficient arrangement of both filters in a modular housing, which can now be replaced also. This shortens the attendance and maintenance time and simplifies the chore of filter replacement.

The modular construction can be extended with advantage to several filter housings, so that several filter modules easily installed in the common housing can be connected to a common air distribution chamber. This enables a better adaptation of the filter makeup on the spot, depending on which substances are detected. For example, a housing which can accommodate three filter modules (submicron particulate filter combined with gas filter) can first be fitted out with only two modules for the anticipated occurrence of noxious substances, and afterwards when the amount of substances increases the third module can be added, the hitherto empty slot having been separated from the air distribution chamber of the cyclone separator by a suitable blind cap.

A configuration that is particularly economical in space and tightly connected to the air distribution chamber is achieved by the dome for the gas filter set on top of the base of the submicron particulate filter. This affords sufficient space for operating elements such as closing levers, connection pieces, and safety locks alongside the walls of the dome, without impairing the performance of the filter. It has been found that a favorable diameter of the dome requires only half the span of the gas filter housing.

It is expedient to provide the housing with covers at its end faces, through which all the parts necessary to fasten or loosen the modules can be manipulated at either end. This improves the accessibility for maintenance and replacement of the modules.

Accordingly, it is an object of the invention to provide a filter assembly which comprises an outer housing with a high separation efficiency coarse dust filter mounted on the outer housing and having a coarse dust filter inlet for the gases to be filtered and a coarse dust filter discharge connected to the interior of the outer housing and which further includes an interior filter housing in the outer housing which has at least one submicron particulate filter and a gas filter connected to said coarse filter discharge.

The various features of novelty which characterize the invention are pointed with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENTS

Figure 1:
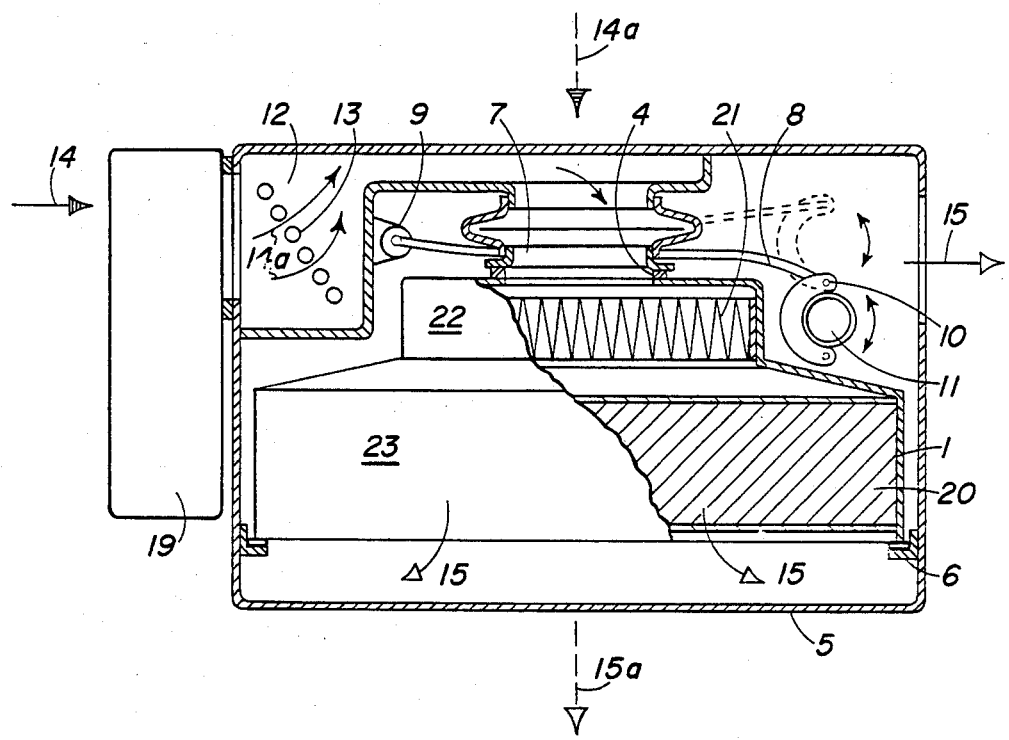
FIG. 1, is a cross section through a filter arrangement housing with cyclone separator flanged on and filter module installed and constructed in accordance with the invention.

In FIG. 1, the filter module 1 comprises a rectangular part 23, containing a gas filter material 20, and a smaller, preferably round part 22, set thereupon and containing the submicron particulate filter 21. The seal 4 produces a tight fixture in the housing 5.

In the housing 5, the filter housing or filter module or modules 1 slide on rails 6. An air-tight connection is achieved by bringing a movable connector part 7 of the housing 5 to the filter housing 1 or its seal 4 and press-fitting it. Lowering is done by a spring buckle 8, which pivots or bears on a bracket 9 and can be moved up or down by means of a toggle lever mechanism 10. The toggle lever mechanism 10 is activated by turning the shaft 11, secured to the housing. The shaft 11 extends in the clearance between the dome-shaped submicron particulate filter housing 22 and the gas filter 23. This accomplished a considerable saving of space. The other clearance is used to arrange an air distribution chamber 12 with favorable position and flow relationships and economization of space in the housing 5. This chamber forms the flow connection between the modules 1 and a cyclone filter 19, in the form of a coarse dust preseparator, flanged to the housing 5.

The air distribution chamber 12 can also accommodate an air heater 13 with no additional space requirement, which is needed when very moist air is suctioned in that could damage the gas filter 20.

The air inlet arrows 14, 14a and outlet arrows 15, 15a shows that it is possible to choose the position of the air connections to suit the space constraints in the vehicle and, accordingly, install the cyclone filter 19 at the side or at the top. The same applies to a blower (not shown). If the air inlet is at the top 14a, then the heater 13 is arranged in the upper flat part of the chamber 12.

Figure 2:
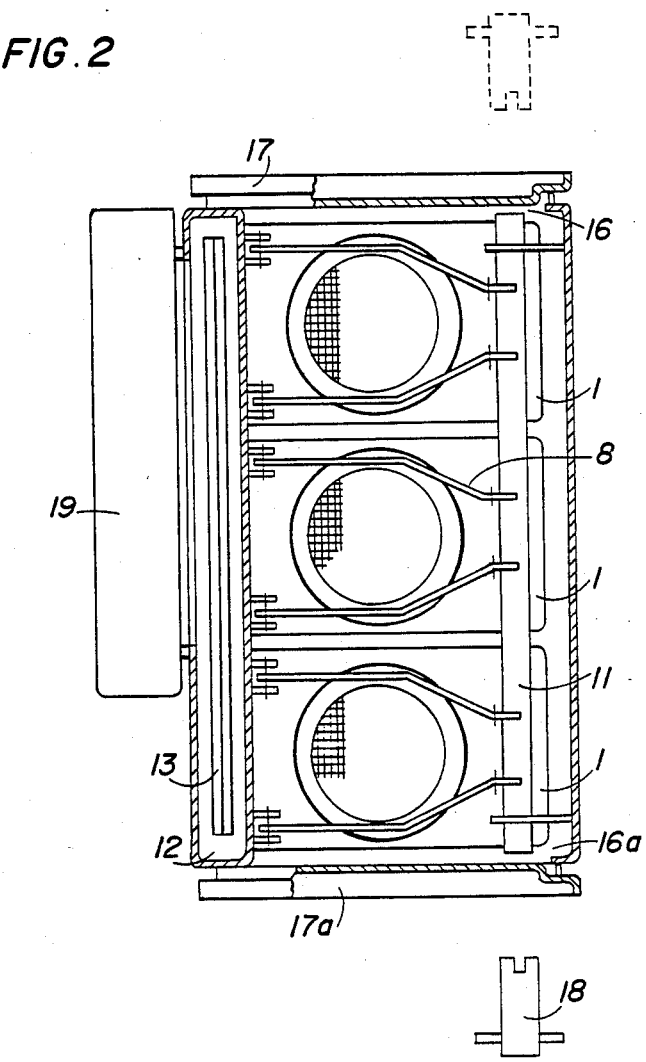
FIG. 2, is a top view of the open housing with three filter modules.

The location of housing openings 16, 16a in FIG. 2 for changing of the filter module 1 is also optional. Thus, the openings can be in the rear of in the front. They can also be both in the rear and in the front, if the filter elements for example are to be installed in the housing 5 from the inside of the vehicle, since the spent filter elements, which may contain poisonous substances, should be pushed out into the surroundings. The filter housing 1 then adjoins on the outer wall of the vehicle by the corresponding opening. Covers 17, 17a close the openings of the housing. The shaft 11 after removal of one of the covers 17, 17a is accessible and can be manipulated by means of a wrench 18. There is no need for pressure screw thread to secure the filter, as formerly was the case. Instead, the aforesaid toggle lever mechanism 10 is used, making possible a very simple motion process—either up or down position.

While specific embodiments of the invention have been shown and described in detail to illustrate the application of the principals of the invention, it will be understood that the invention may be embodied otherwise without departing from such principles.

What is claimed is:

1. A filter assembly, comprising a filter housing, an exterior housing mounted on said filter housing having a high separation efficiency coarse cyclone dust exterior separator therein with a coarse dust inlet and a coarse dust discharge connected into the interior of said filter housing, an interior filter housing in said filter housing, at least one submicron particulate filter and a sorbent filter in said interior filter connected to said coarse separator discharge, said filter housing having transversely extending side walls with a rail extending along each side wall supporting said interior filter, said filter housing having a distributing chamber at the connection of said coarse dust filter discharge to said filter housing with a downwardly extending lip, said interior filter housing having an upwardly extending sealing lip, a flexible seal interconnecting the lip of said interior filter and said distribution chamber lip, a rotating shaft extending between said side walls of said filter housing, a toggle switch carried on said rotating shaft, a bracket in said housing spaced from said shaft, a spring element pivoted on said bracket and connected to said toggle switch and being movable by operation of said switch to provide a tight sealing interconnection between said seal and said interior filter housing.

2. A filter assembly according to claim 1, wherein there are a plurality of interior filter housings arranged in a row said rail in said housing each being connectable by rotation of said shaft to accuate said toggle switch to make the sealing engagement between said flexible sealing member and the seal lip of said interior filter housing.

3. A filter assembly, comprising a filter housing, an exterior housing mounted on said filter housing having a high separation efficiency coarse cyclone dust exterior separator therein with a coarse dust inlet and a coarse dust discharge connected into the interior of said filter housing, an interior filter housing, in said filter housing, at least one submicron particulate filter and a sorbent filter, in said interior housing connected to said coarse dust separator discharge, said sorbent filter being connected to said coarse dust separator discharge downstream of said submicron particulate filter a plurality of interior filter housings in said filter housing, each interior filter housing having an inlet connected to said coarse dust separator discharge.

4. A filter assembly, comprising a filter housing, an exterior housing mounted on said filter housing having a high separation efficiency coarse cyclone dust exterior separator therein with a coarse dust inlet and a coarse dust discharge connected into the interior of said filter housing, an interior filter housing in said filter housing, at least one submicron particulate filter and a sorbent filter in said interior filter housing connected to said coarse separator discharge, a member on each side of the interior of said filter housing defining a track way in the interior of said filter housing, said interior filter housing including a dome portion connected to said coarse dust separator, and a cylindrical chamber below said dome shaped portion containing said sorbent filter.

5. A filter assembly, comprising a filter housing, an exterior housing mounted on said filter housing having a high separation efficiency coarse cyclone dust exterior separator therein with a coarse dust inlet and a coarse dust discharge connected into the interior of said filter housing, an interior filter housing in said filter housing, at least one submicron particulate filter and a sorbent filter in said interior filter connected to said coarse separator discharge, said outer housing accommodating a plurality of interior filter housings, each including an upper portion connected to said coarse dust separator with an annular lips on the interior of said filter housing defining a plurality of flanged receiving openings wherein there is an interior filter housing below each of said openings, and including a seal connected between said filter interior housing and each of said flanged openings.

6. A filter assembly according to claim 5, including a toggle lever carried on said housing and being rotatable and including a spring member manipulatable by said toggle lever by rotation thereof and engageable with said seal for raising said seal above the connection to said interior housing and through a closed position in which it engages the seal on the interior housing.

* * * * *